US008631662B2

(12) United States Patent
Castle et al.

(10) Patent No.: US 8,631,662 B2
(45) Date of Patent: Jan. 21, 2014

(54) TESTING SYSTEM AND METHOD FOR AC SYSTEM IN A VEHICLE

(75) Inventors: Terry Castle, Greensburg, IN (US); Tiffany Kasettratut, Indianapolis, IN (US); Richard McDonald, Westport, IN (US); Charles Hudgins, Shelbyville, IN (US); Kevin Lilly, Shelbyville, IN (US)

(73) Assignee: Honda Motor Co., Ltd., Tokyo (JP)

( * ) Notice: Subject to any disclaimer, the term of this patent is extended or adjusted under 35 U.S.C. 154(b) by 883 days.

(21) Appl. No.: 12/751,073

(22) Filed: Mar. 31, 2010

(65) Prior Publication Data

US 2011/0240132 A1    Oct. 6, 2011

(51) Int. Cl.
*F25B 19/00* (2006.01)
*F25B 45/00* (2006.01)
*B60H 1/32* (2006.01)

(52) U.S. Cl.
USPC ........ 62/100; 62/540; 62/77; 62/239; 62/292; 73/40.5 R; 73/37; 73/38; 73/39; 73/40; 236/49.3

(58) Field of Classification Search
USPC ..................... 62/100, 540, 77, 239, 270, 292; 73/40.5 R, 37–49.8; 236/49.3
See application file for complete search history.

(56) References Cited

U.S. PATENT DOCUMENTS

| | | | |
|---|---|---|---|
| 4,688,388 A | 8/1987 | Lower et al. | |
| 5,898,102 A * | 4/1999 | Skantar | 73/39 |
| 6,631,618 B2 | 10/2003 | Renders | |
| 6,901,947 B2 * | 6/2005 | Danielson et al. | 137/315.41 |
| 7,451,606 B2 | 11/2008 | Harrod | |
| 2007/0240434 A1 * | 10/2007 | Allen et al. | 62/129 |
| 2008/0083526 A1 * | 4/2008 | Young et al. | 165/11.1 |
| 2008/0164006 A1 * | 7/2008 | Karamanos | 165/67 |
| 2008/0307858 A1 * | 12/2008 | McManus et al. | 73/40.7 |

FOREIGN PATENT DOCUMENTS

DE      102006052551      8/2008

* cited by examiner

*Primary Examiner* — Frantz Jules
*Assistant Examiner* — Erik Mendoza-Wilkenfel
(74) *Attorney, Agent, or Firm* — Rankin, Hill & Clark LLP

(57) ABSTRACT

A pressure and prevacuum testing system for an AC system in a vehicle includes an air pressure source for pressurizing a cooling circuit of the AC system to a predetermined high pressure threshold and a vacuum source for prevacuuming the cooling circuit either to a predetermined prevacuum low pressure level or for a predetermined time period. The system also includes a pressure gauge for operatively measuring a pressure level in the cooling circuit. A controller is operatively connected to the air pressure source, the vacuum source and the pressure gauge. The controller compares the pressure level as measured by the pressure gauge to the predetermined high pressure threshold during a pressurized test of the cooling circuit and to the predetermined prevacuum low pressure level during a prevacuum test of the cooling circuit to determine if leaks are present in the cooling circuit.

10 Claims, 3 Drawing Sheets

TESTING SYSTEM AND METHOD FOR AC SYSTEM IN A VEHICLE

BACKGROUND

Exemplary embodiments herein relate to testing of AC systems in vehicles, and more particularly relate to an improved testing system and method wherein a cooling circuit of an AC system is pressurized and prevacuumed during production and testing thereof.

During vehicle production, it is often desirable to test a vehicle's HVAC system during production thereof. In particular, it can be desirable to test the AC cooling circuit of a vehicle's HVAC system during production thereof to ensure that no leaks are present in the cooling circuit before the cooling circuit is filled with coolant and/or before the vehicle leaves the manufacturing facility.

In one known production facility, HVAC systems are installed on vehicle bodies moving along an assembly line. The vehicle bodies with the HVAC systems installed progress to a fill station where the cooling circuit of the HVAC system is filled with a suitable coolant. Should there be a leak in the cooling circuit, the coolant could escape. When the leak is a relatively small leak, the leak may not be discovered until well after the vehicle leaves the manufacturing facility, and may be not for many months or years after the vehicle leaves the manufacturing facility. This can result in increased warranty claims and overall consumer dissatisfaction.

SUMMARY

According to one aspect, a method for testing an AC cooling circuit in a vehicle HVAC system includes pressurizing the AC cooling circuit, testing the AC cooling circuit for pressurized leaks after pressurizing, prevacuuming the AC cooling circuit, and testing the AC cooling circuit for prevacuum leaks after prevacuuming.

According to another aspect, a method for testing and filling an AC system in a vehicle is provided. In the method according to this aspect, the AC system is advanced to a testing station having a pneumatic pressure source and a vacuum source. A cooling circuit of the AC system is pressurized and the cooling circuit is tested for pressurized leaks. The cooling circuit is then prevacuumed and the cooling circuit is tested for prevacuum leaks. Next, the AC system is advanced to a fill station. At the fill station, the cooling circuit is vacuumed and the cooling circuit is tested for vacuum leaks. The cooling circuit is filled when a pressure level of the cooling circuit remains below a predetermined threshold for a predetermined time period during testing of the cooling circuit for vacuum leaks.

According to still another aspect, a pressure and prevacuum testing system for an AC system in a vehicle includes an air pressure source for pressurizing a cooling circuit of the AC system to a predetermined high pressure threshold and a vacuum source for prevacuuming the cooling circuit either to a predetermined prevacuum low pressure level or for a predetermined time period. The system also includes a pressure gauge for operatively measuring a pressure level in the cooling circuit. A controller is operatively connected to the air pressure source, the vacuum source and the pressure gauge. The controller compares the pressure level as measured by the pressure gauge to the predetermined high pressure threshold during a pressurized test of the cooling circuit and to the predetermined prevacuum low pressure level during a prevacuum test of the cooling circuit to determine if leaks are present in the cooling circuit.

DETAILED DESCRIPTION

Figure 1:
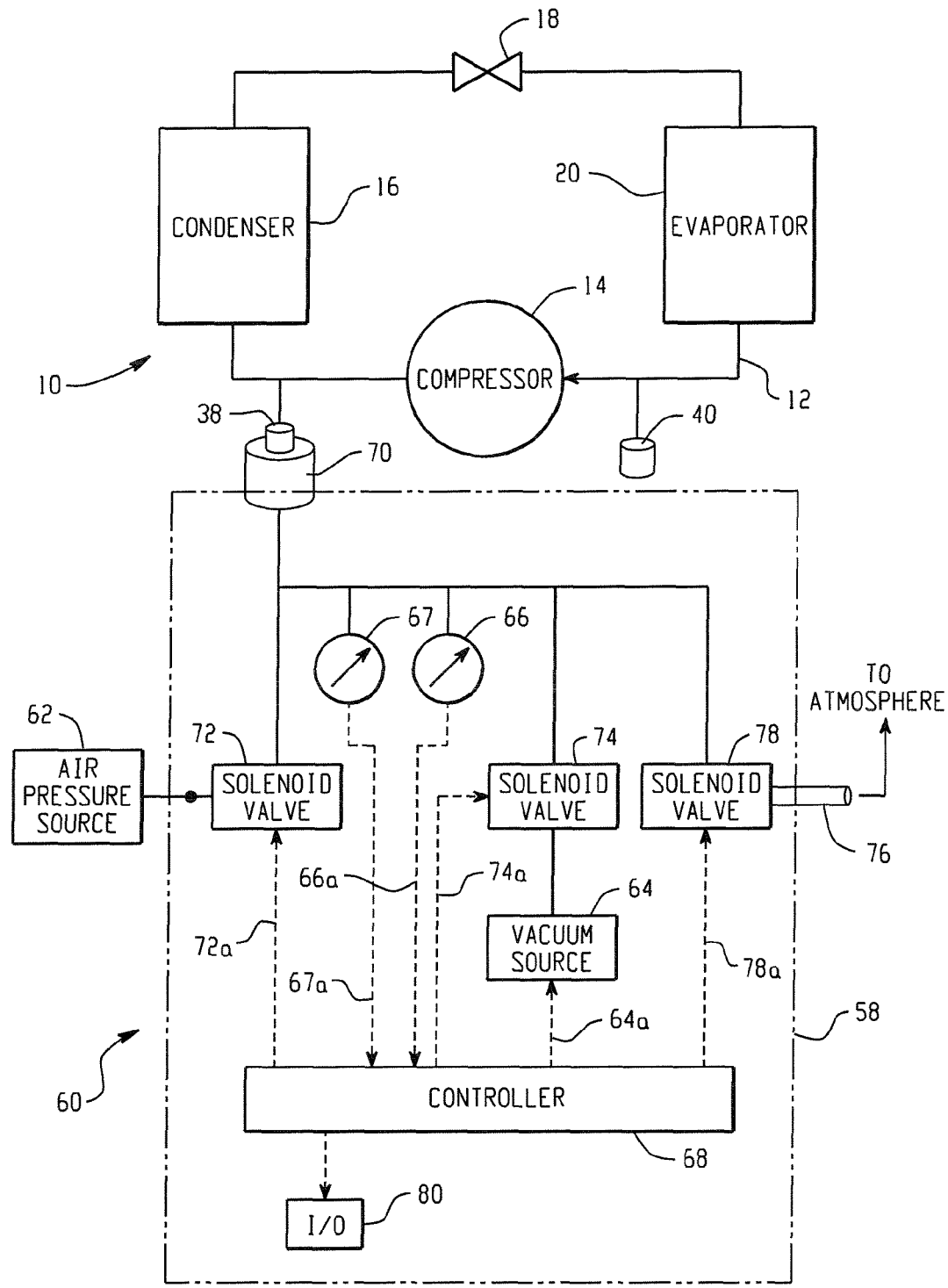
FIG. 1 is a schematic view of a pressure and prevacuum testing system coupled to an AC cooling circuit of a vehicle's HVAC system.

Referring now to the drawings, wherein the showings are for purposes of illustrating one or more exemplary embodiments and not for purposes of limiting same, FIG. 1 schematically illustrates an AC system 10 having an AC cooling circuit 12 of the type used in a vehicle HVAC system. The cooling circuit 12 includes a compressor 14, a condenser 16, an expansion valve 18, and evaporator 20. As shown, the cooling circuit 12 can include a high side port 38 and a low side port 40 flanking the compressor 14. The ports 38, 40 enable the cooling circuit 12 to be initially filled with a refrigerant and later allow the refrigerant to be supplemented and/or replaced. During manufacture of the AC system 10, and more generally during manufacture of the vehicle in which the AC system 10 is installed, the cooling circuit 12 can be tested for leaks prior to being filled with the refrigerant.

In one known testing method, leak detection of the cooling circuit 12 is performed completely at a fill station (i.e., a station in an assembly line where the cooling circuit 12 is filled). In this known method, vehicles undergo a vacuum process for a predetermined period of time (e.g., 45 seconds) in which a vacuum is applied to the cooling circuit. After vacuuming, the cooling circuit 12 is left idle for a predetermined period of time (i.e., a delay) before a pressure level in the cooling circuit 12 is checked. After the delay (e.g., 10 seconds), the vacuum pressure level within the cooling circuit 12 (i.e., a vacuum decay check value) is compared against a predetermined vacuum pressure level threshold to determine is any significant vacuum decay has occurred. If the pressure level in the cooling circuit 12 is above the predetermined threshold, the vehicle, and particularly the AC system 10, would fail the leak detection test and the cooling circuit 12 would not be filled.

Figure 2:
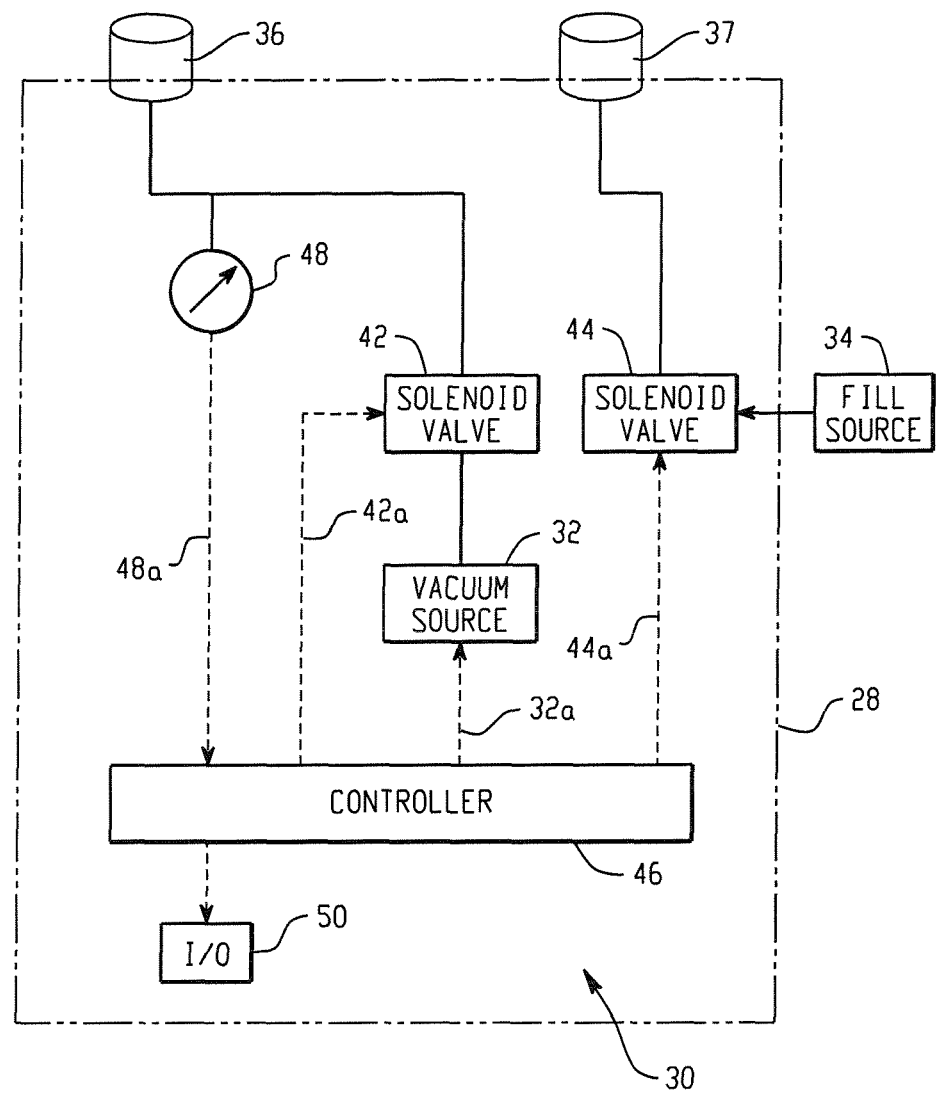
FIG. 2 is a schematic view of a vacuum and filling system for an AC system of a vehicle.

With additional reference to FIG. 2, a testing and filling system 30 includes a vacuum source 32 and a fill source 34. When fluidly connected to the cooling circuit 12 of FIG. 1, the vacuum source 32 is able to apply a vacuum to the cooling circuit 12. Similarly, when fluidly connected to the cooling circuit 12, the fill source 34 is able to deliver a suitable coolant (e.g., R-134a) to the cooling circuit 12. The testing and filling system 30 can be provided along a vehicle manufacturing line (e.g., at a fill station 28) for performing the method of applying a vacuum to the cooling circuit 12, allowing a delay time to elapse and testing the cooling circuit 12 to determine if a vacuum decay check value or pressure level has risen above a predetermined threshold pressure level (e.g., 2.5 mmHg).

The illustrated testing and filling system 30 includes adapters 36, 37 that are selectively fluidly connected to the vacuum source 32 and the fill source 34. As is known and understood by those skilled in the art, the adapter 36 can be configured to cooperatively connect to the port 38 and the adapter 37 can be configured to cooperatively connect to the port 40. The system 30 can further include a plurality of solenoid valves, with one solenoid valve 42 of this plurality interposed between the vacuum source 32 and the adapter 36 and another solenoid valve 44 fluidly interposed between the fill source 34 and the adapter 37. The solenoid valves 42, 44 can be operatively connected to a controller 46 for control thereof (e.g., via command signals 42a and 44a). More specifically, the controller 46 can selectively operate the solenoid valves 42, 44 to selectively fluidly connect the vacuum source 32 and the fill source 34 to the respective adapters 36, 37 and thus the cooling circuit 12, as desired. Though not shown, the system 30 can be alternatively configured so that the vacuum source 32 can be connected to both adapters 36, 37 for applying a vacuum force to the cooling circuit 12 through both ports 38, 40.

The system 30 can additionally include a pressure gauge 48 that can be fluidly connected to the cooling circuit 12 via the adapter 36 to measure a pressure level within the cooling circuit 12. In one embodiment, the pressure gauge is a vacuum transducer capable of measuring absolute pressure in the cooling circuit (e.g., within a range of 0-20 mmHg). The pressure gauge 48 can be operatively connected to the controller 46 for communicated a measured pressure level (e.g., a measured absolute pressure) in the cooling circuit 12 to the controller 46 via signal 48a. The controller 46 can be configured to determine if the pressure level within the cooling circuit 12 is above the pressure threshold (after a vacuum is applied to the cooling circuit and a delay time period has lapsed) for determining that a leak is present in the cooling circuit 12 and thus the cooling circuit 12 should not be filled with coolant.

An input/output interface, such as a touch-screen display 50, can be operatively connected to the controller 46 for displaying information as commanded by the controller 46. For example, the display 50 can display an indication of whether the pressure level in the cooling circuit 12 is above the pressure threshold. Of course, other input/output interfaces could be used in addition or in substitution for the touch-screen display 50 (e.g., a non-touch screen display, a keyboard, actuators, and light indicators, etc.).

One problem with relying solely on the system 30 for leak detection at the fill station 28 along the assembly line is that moisture within the cooling circuit 12 and/or the components 14, 16, 18, 20 thereof can cause artificially high vacuum decay check values (i.e., pressure levels seen by the pressure gauge 48 during testing of the cooling circuit 12 after a vacuum is applied to the cooling circuit 12 and a prescribed delay has expired). Moisture in the cooling circuit 12 or its components 14-20 can adversely impact the leak detection method at the fill station 28. This is because too many cooling circuits and AC systems would be deemed to have a leak when in fact many of the systems have no leaks, but fail the vacuum decay check test due to moisture within the system.

In an attempt to overcome the moisture problem, the method for testing AC cooling circuits solely at the fill station was modified such that the cooling circuit 12 is pressurized prior to being vacuumed and having the pressure level checked after a specified delay (i.e., vacuum decay check). In particular, in a modified testing method, the cooling circuit 12 is pressurized to a predetermined high pressure level (e.g., 80 psi) and then vented. After pressurizing and venting, the cooling circuit 12 can be vacuumed and vacuum decay tested as already described. It is believed that such pressurizing and venting pulls some moisture out of the cooling circuit 12 and/or its components 16-20. This improves the results of the vacuum decay test at the fill station, but only somewhat. Despite pressurizing and venting prior to the vacuum decay test, some moisture can remain in the cooling circuit 12 and/or its components 16-20, which reduces the accuracy and reliability of the vacuum decay test at the fill station 28.

To overcome the drawbacks of these vacuum decay testing systems and methods (e.g., performed at the fill station 28 without any prevacuuming or pressurization or performed at the fill station with only pressurization), a pressure and prevacuum system 60 is illustrated in FIG. 1 for testing an AC system in a vehicle, such as the cooling circuit 12 of the AC system 10. The system 60, which can be provided at a testing station 58 disposed in advance of the fill station 28 along a manufacturing line, includes an air pressure source 62 for pressurizing the cooling circuit 12 of the AC system 10 to a predetermined high pressure threshold and a vacuum source 64 for prevacuuming the cooling circuit 12 either to a predetermined prevacuumed low pressure level or for a predetermined time period, whichever occurs first. The air pressure source 62 can be an external source, such as a pressurized air system conventionally provided at a manufacturing facility.

The system 60 further includes at least one pressure gauge (e.g., pressure gauges 66 and 67) for measuring a pressure level in the cooling circuit 12. In the illustrated embodiment, the system 60 includes first pressure gauge 66, which can be a pressure transducer, for measuring relative or gauge pressure in the cooling circuit (e.g., within a range of 1-100 psi or 6.89-689 kPa) and second pressure gauge 67, which can be vacuum transducer, for measuring absolute pressure in the cooling circuit (e.g., within a range of 0-20 mmHg). Alternatively, a single pressure gauge could be used, but accuracy of the pressure readings may be reduced.

A controller 68 can be operatively connected to the air pressure source 62, the vacuum source 64 and the at least one pressure gauge (e.g., pressure transducer 66 and vacuum transducer 67). By this arrangement, the pressure gauges 66, 67 can supply respective signals 66a, 67a to the controller 68 corresponding to respective measured pressure levels in the cooling circuit 12. As will be described in more detail below, the controller 68 compares the pressure level (e.g., relative pressure) as measured by the pressure gauge 66 in the cooling circuit 12 to the predetermined high pressure threshold during a pressurized test of the cooling circuit 12 and compares the pressure level (e.g., absolute pressure) as measured by the pressure gauge 67 to a predetermined prevacuum low pressure level during a prevacuum test of the cooling circuit to determine if leaks are present in the cooling circuit 12.

Like the system 30, the system 60 can include an adapter 70 for coupling with the port 38 (or the port 40) of the cooling circuit 12. The adapter 70 is selectively fluidly connected to the pressure source 62 and the vacuum source 64 by the controller 68. More particularly, the system 60 can include a plurality of solenoid valves, including one solenoid valve 72 fluidly interposed between the pressure source 62 and the adapter 70 and another solenoid valve 74 fluidly interposed between the vacuum source 64 and the adapter 70. The solenoid valves 72, 74 are each operatively connected to the controller 68 for control thereof. More particularly, the controller 68 operates the solenoid valves 72, 74 to selectively fluidly connect the pressure source 62 and the vacuum source 64 to the cooling circuit 12 via the adapter 70 and the port 38. The system 60 can additionally include a vent 76 that is selectively fluidly connected to the adapter 70 by the controller 68 for venting to atmosphere. More specifically, another solenoid valve 78 can be fluidly interposed between the vent 76 and the adapter 70, and also operatively connected to the controller 68 for control thereof. It should also be appreciated by those skilled in the art that additional solenoid valves and/or alternate arrangements could also be used.

An input/output interface, such as a touch-screen display 80, can be operatively connected to the controller 68 for displaying information as commanded by the controller 68. For example, the display 80 can display an indication of whether the relative pressure level in the cooling circuit 12 is higher than the predetermined high pressure threshold during the pressurized test and whether the absolute pressure level in the cooling circuit 12 is lower than the predetermined prevacuum low pressure threshold during the prevacuum test. Of course, other input/output interfaces could be used in addition or in substitution for the touch-screen display 80 (e.g., a non-touch screen display, a keyboard, actuators, and light indicators, etc.).

Figure 3:
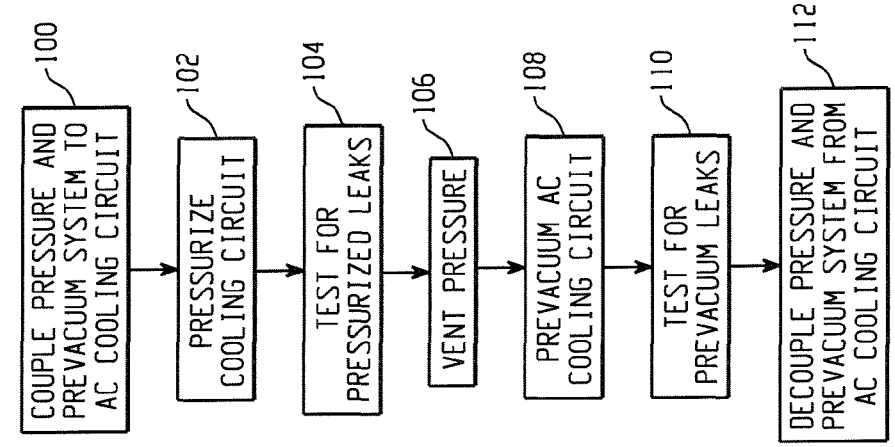
FIG. 3 is a schematic block diagram of a method for testing an AC cooling circuit in a vehicle HVAC system.

With reference to FIG. 3, a method for testing an AC cooling circuit in a vehicle HVAC system will now be described. In particular, the method will be described in reference to the pressure and prevacuum system 60 of FIG. 1, though it is to be appreciated that the method could be used with other testing systems and equipment. In the method, the pressure and prevacuum system 60, which has the pneumatic pressure source 62 and the vacuum source 64, is coupled to the cooling circuit 12 in 100 prior to pressurizing the cooling circuit 12. In particular, coupling of the system 60 to the cooling circuit 12 can include fluidly connecting the adapter 70 to the high side port 38. Once the adapter 70 is connected, the cooling circuit 12 can be pressurized in 102. In particular, the controller 68 can command the solenoid valve 72 to open via command signal 72a to allow fluid communication between the air pressure source 62 and the cooling circuit 12 via the adapter 70 and port 38.

In one embodiment, pressurizing the cooling circuit 12 in 102 occurs until a relative pressure level in the cooling circuit 12 is above a predetermined high pressure threshold, such as above approximately 40 PSI (or 278 kPa) relative pressure, or a predetermined pressurizing time period (e.g., 10 seconds) expires. Such filling to the predetermined high pressure threshold or pressurizing until the predetermined time period expires can be controlled by the controller 68. More particularly, the pressure gauge 66 can provide a signal 66a to the controller 68 indicative of a relative pressure level in the cooling circuit 12. The controller 68 can compare the pressure level as measured by the pressure gauge 66 to the predetermined high pressure threshold, which can be stored in a memory of the controller 68. When the pressure level in the cooling circuit 12 as measured by the pressure gauge 66 reaches or exceeds the predetermined high pressure threshold or the predetermined pressurizing time period expires, the controller 68 can command solenoid valve 72 via command signal 72a to close thereby fluidly disconnecting the pressure source 62 from the cooling circuit 12. The predetermined pressurizing time period is used during pressurizing in 102 to account for situations where reaching the predetermined high pressure threshold is not possible, such as when a leak is present in the cooling circuit 12 being pressurized.

After pressurizing (or during pressurizing), the cooling circuit 12 can be tested for pressurized leaks in 104, though this is not required. This can include visual monitoring for any blow-out leaks (e.g., large leaks) and/or an obvious leak situation when pressurizing of the cooling circuit 12 is not possible due to the presence of a large leak. Alternatively, the controller 68 can compare a measured pressure by the pressure gauge 66 to the predetermined high pressure threshold, particularly after a predetermined period of time (i.e., a delay) to determine if a leak is present. More specifically, it can be determined that a leak is present when the pressure level within the cooling circuit 12 cannot be maintained and the thus the pressure gauge 66 indicates a reduced pressure after the predetermined period of time.

Next, the cooling circuit 12 can be vented after pressurizing in 102 and testing for pressurized leaks in 104. More specifically, the controller 68 can command the solenoid valve 78 via command signal 78a to open allowing the high pressure of the cooling circuit 12 to escape to atmosphere via the vent 76. Once the cooling circuit 12 has been vented, the controller 68 can command a solenoid valve 78 to close via another command signal 78a. Optionally, no venting is required and thus 106 can be skipped. Whether or not testing occurs in 104 or venting occurs in 106, the cooling circuit 12 can next be prevacuumed in 108. More particularly, prevacuuming can include the controller 68 commanding the vacuum source 64 to turn on via signal 64a and the solenoid valve 74 to open via command signal 74a. This can apply a vacuum to the cooling circuit 12 via the adapter 70 and port 38. In one embodiment, prevacuuming in 108 occurs until either an absolute pressure level as measured by the pressure gauge 67 in the cooling circuit 12 is below a predetermined prevacuum low pressure threshold or a predetermined time period expires, whichever occurs first.

For example, the predetermined prevacuum low pressure threshold can be approximately 0.5 mmHg and the predetermined time period can be approximately 40 seconds, though other pressures and time periods could be used. In this example, the prevacuuming would end when the absolute pressure level in the cooling circuit 12 reaches or drops below 0.5 mmHg or the predetermined time period of 40 seconds elapses. In either case, prevacuuming can end by the controller 68 closing the solenoid valve 74 via command signal 74a and/or turning off the vacuum source 64 via signal 64a. The predetermined time period is used during prevacuuming in 108 to account for situations where reaching the predetermined low pressure threshold is not possible, such as when a leak is present in the cooling circuit 12 being tested. When employed, venting pressure from the cooling circuit 12 and 106 can make the prevacuuming of the cooling circuit 12 in 108 more expedient (i.e., the high pressure need not be prevacuumed).

After prevacuuming in 108, the cooling circuit 12 can be tested for prevacuum leaks in 110. Testing for prevacuum leaks in 110 can include measuring the pressure level in the cooling circuit 12 after a period of time (i.e., a prevacuum decay check) to determine whether the vacuumed pressure level remains steady in the cooling circuit 12 or at least remains below a predetermined prevacuum low pressure threshold. In one embodiment, this predetermined prevacuum low pressure threshold is 2 mmHg and the delay between application of the prevacuum to the cooling circuit 12 and testing the pressure level in the cooling circuit 12 is a half second.

In operation, the controller 68 can receive an absolute pressure measurement via the pressure gauge 67 after the closing the solenoid valve 74 and applying the prevacuum decay delay. When the controller 68 determines that the pressure level in the cooling circuit 12 is not maintained below the predetermined low pressure threshold during testing in 110, the controller 68 can display an indication of a failed test on the display 80. Also, the controller 68 can display an indication of a passed test on the display 80 when the pressure level in the cooling circuit 12 remains below the predetermined low pressure threshold during testing in 110. After prevacuuming in 108 and testing for prevacuum leaks in 110, the pressure and prevacuum system 60 can be decoupled from the cooling circuit 12 in 112. This can include disconnecting the adapter 70 from the port 38.

When a leak is found during testing in 104 or testing in 110, a repair can be made to the cooling circuit 12. Advantageously, this repair can be made prior to the cooling circuit 12 moving to the fill station 28. For example, a repair to the cooling circuit 12 (or one of its components 14-20) could be made as the HVAC system and the vehicle body on which it is installed moves along the assembly line from the testing station 58 toward the fill station 28. This is particularly advantageous because if a leak were first discovered at the fill station 28, there is less opportunity to repair the problem without unduly delaying assembly of the vehicle on which the cooling circuit 12 is included. After decoupling in 112, the vehicle, and the cooling circuit 12, is advanced to the testing station 28, which can include the testing and filling system 30 of FIG. 2.

Figure 4:
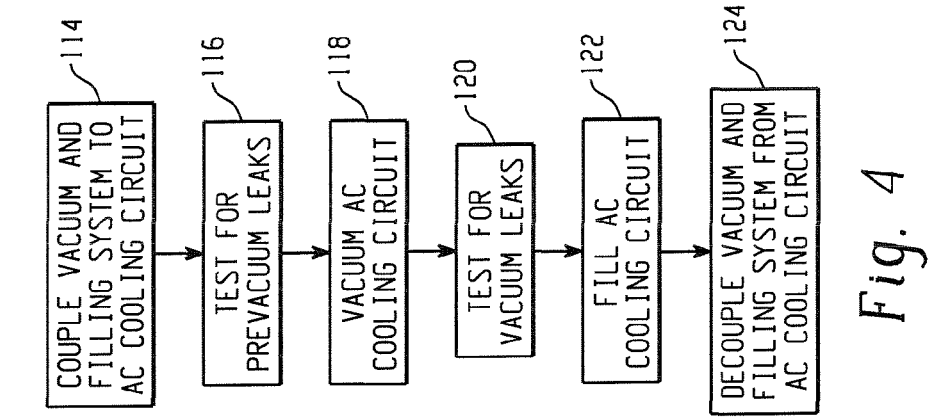
FIG. 4 is a schematic block diagram of a method for testing and filling an AC cooling circuit in a vehicle HVAC system.

At the filling station 28, with additional reference to FIG. 4, the vacuum and filling system 30, which has the vacuum source 32 and the fill source 34, can be coupled to the cooling circuit 12 in 114. More particularly, the adapter 36 can be connected to the port 38 of the cooling circuit 12 and adapter 37 can be connected to the port 40 of the cooling circuit 12. Optionally, the vacuum and filling system 30 can test for prevacuum leaks in 116. In particular, the controller 46 can compare a pressure level in the cooling circuit 12 as measured by the pressure gauge 48 and communicated via signal 48a to a second predetermined prevacuum low pressure threshold to determine whether the vacuum level has decayed since it was applied in 108 and/or tested in 110 at the testing station 58. For example, the controller 46 can determine whether the pressure level as measured by the pressure gauge 48 in the cooling circuit 12 is below 2 mmHg (i.e., an exemplary second predetermined prevacuum low pressure threshold). If the controller 46 determines that the pressure level in the cooling circuit 12 is above the predetermined second low pressure threshold in 116, the controller 46 can command the display 50 to provide an indication that there is a leak in the cooling system 12. The controller 46 can also command the display 50 to display an indication that there is no leak (i.e., the cooling circuit 12 has passed the test for prevacuum leaks in 116) when the pressure level remains below the predetermined low pressure threshold (i.e., has not decayed).

Next, the cooling circuit 12 can be vacuumed in 118. More particularly, the controller 46 can command the solenoid valve 42 to open via signal 42a and can turn on the vacuum source 32 via command signal 32a to apply a vacuum to the cooling circuit 12 via the adapter 36 and the port 38 (and optionally through the adapter 37 when the system 30 is configured for applying the vacuum through both ports 38 and 40). In one embodiment, vacuuming the cooling circuit 12 in 118 occurs until one of: a pressure level in the cooling circuit 12 is below a predetermined vacuum low pressure threshold or a predetermined vacuum time period expires. By way of example, the predetermined vacuum low pressure threshold can be approximately 0.08 mmHg and the predetermined vacuum time period can be approximately 45 seconds. If the pressure gauge 48 indicates that the pressure level in the cooling circuit 12 is below the predetermined vacuum low pressure threshold or the predetermined time period expires, the controller 46 can command the solenoid valve 42 to close via command signal 42a and can turn off the vacuum source 32 via the signal 32a.

After vacuuming the cooling circuit 12, the pressure and prevacuum system 30 can test the cooling circuit 12 for vacuum leaks in 120. Such testing for the cooling circuit 12 for vacuum leaks can occur after a predetermined delay after vacuuming of the cooling circuit 12 in 118 (i.e., a vacuum decay check). For example, the delay can be ten seconds. Testing for vacuum leaks in 120 can include the controller 46 comparing a pressure level (e.g., an absolute pressure level) as measured by the pressure gauge 48 in the cooling circuit 12 to a predetermined vacuum low pressure threshold. In one embodiment, the predetermined vacuum low pressure threshold is approximately 1.2 mmHg. Should the pressure level in the cooling circuit 12 be determined to not be below the predetermined low pressure threshold in 120, the controller 46 can command the display 50 to indicate that the cooling circuit 12 has failed the test for vacuum leaks in 120. Optionally, when the pressure level is at or below the predetermined low pressure threshold in 120, the controller 46 can command the display 50 to indicate that the cooling circuit 12 has passed the test for vacuum leaks in 120.

If the pressure level in the cooling circuit 12 is below the predetermined vacuum low pressure threshold, as determined in 120, the cooling circuit 12 can be filled with a suitable coolant or refrigerant in 122 (e.g., R-134a). More particularly, the controller 46 can command the solenoid valve 44 to open via command signal 44a. This fluidly connects the fluid source 34 to the cooling circuit 12 via the adapter 37 and the port 40 thereby allowing the cooling circuit 12 to be filled with refrigerant from the fill source 34. As is known and understood by those skilled in the art, the controller 46 can operate the solenoid valve 44 such that an appropriate amount of the fluid source 34 is filled into the cooling circuit 12. After filling, the vacuum and filling system 30 can be decoupled in 124 from the cooling circuit 12 (i.e., the adapter 37 can be disconnected from the port 40).

Advantageously, prevacuuming in 108 prior to vacuuming in 118 can effectively remove sufficient moisture from the cooling circuit 12. This can improve the accuracy for the test of vacuum leaks in 120. Accordingly, the testing in 120 more accurately distinguishes between cooling circuits with leaks and those without. In particular, it is believed that pressurizing the cooling circuit in 102 and prevacuuming the cooling circuit in 108 prior to vacuuming the cooling circuit in 118 and testing for vacuum leaks in 120 is most effective for removing moisture from AC cooling circuits, moisture which is believed to cause inaccurate tests for vacuum leaks when not removed.

Figure 5:
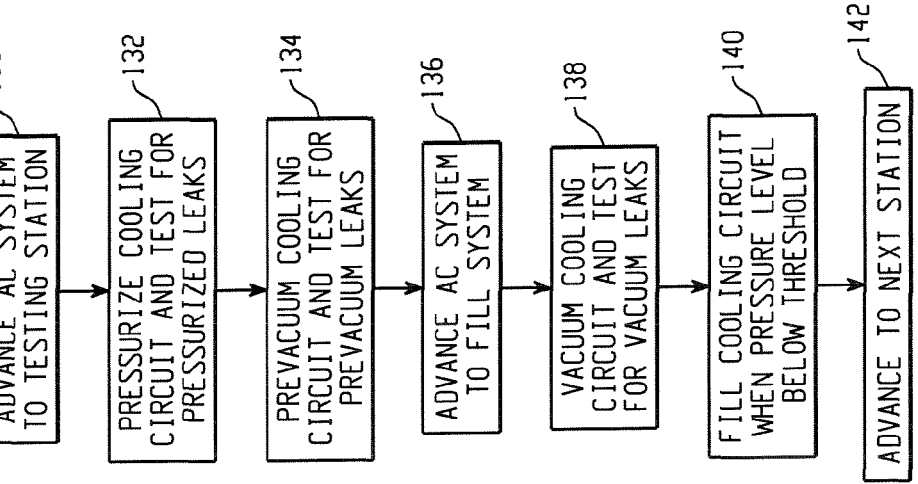
FIG. 5 is a schematic block diagram of a method for testing and filling an AC system in a vehicle.

With reference to FIG. 5, a method for testing and filling an AC system in a vehicle will now be described. The method of FIG. 5 will be described with particular reference to the systems 30 and 60 of FIGS. 1 and 2, though it is to be appreciated that the method could be used with other systems and equipment. In the method, the AC system 10 having the cooling circuit 12 is advanced to the testing station 58 in 130, the testing station 58 having the pressure source 62 and the vacuum source 64. Next, the cooling circuit 12 of the AC system 10 is pressurized and the cooling circuit 12 is tested for pressurized leaks in 132. This can be the same or similar to 102 and 104 of FIG. 3 described above. After 132, the cooling circuit is prevacuumed and the cooling circuit is tested for prevacuum leaks in 134. This can be the same or similar to 108 and 110 of FIG. 3 as described above. Optionally, though not shown, the cooling circuit 12 can be vented between 132 and 134.

After 134, the AC system 10 is advanced to the fill station 28 in 136. At the fill station 28, the cooling circuit 12 is vacuumed and the cooling circuit 12 is tested for vacuum leaks in 138. This can be the same or similar to 118 and 120 of FIG. 4 as described above. Optionally, though not shown, the cooling circuit can again be tested for prevacuum leaks at the fill station 28 prior to vacuuming in 138. After vacuuming and testing, the cooling circuit 12 is filled in 140 when a pressure level of the cooling circuit 12 remains below a predetermined vacuum low pressure threshold for a predetermined decay time period during testing of the cooling circuit 12 for vacuum leaks in 138. This can be the same or similar to 122 of FIG. 4 as described above. After filling, the cooling circuit 12, and more generally the vehicle on which the cooling circuit 12 is installed, can be advanced to the next station in 142 for further assembly.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for testing an AC cooling circuit in a vehicle HVAC system, comprising:
   coupling a pressure and a prevacuum system having a pneumatic pressure source and a vacuum source to the AC cooling circuit, and after coupling the pressure and prevacuum system to the AC cooling circuit, the method for testing includes:
   pressurizing the AC cooling circuit;
   testing the AC cooling circuit for pressurized leaks after pressurizing;
   prevacuuming the AC cooling circuit; and
   testing the AC cooling circuit for prevacuum leaks after prevacuuming
   decoupling the pressure and prevacuum system from the AC cooling circuit after prevacuuming and testing for prevacuum leaks;
   coupling a separate vacuum and fill system having a separate vacuum source and a fill source to the AC cooling circuit after decoupling the pressure and prevacuum system, and after coupling the vacuum and fill system to the AC cooling circuit, the method for testing includes:
   prevacuuming the AC cooling circuit
   testing the AC cooling circuit for prevacuum leaks after prevacuuming;
   vacuuming the AC cooling circuit after prevacuuming and testing for vacuum leaks: and
   testing the AC cooling circuit for vacuum leaks after vacuuming;
   filling the AC cooling circuit; and
   decoupling the vacuum and fill system from the AC cooling circuit after filling the AC cooling circuit;
   advancing an AC system having the AC cooling circuit to a testing station of a vehicle assembly line having the pressure and prevacuum system; and
   advancing the AC system to a fill station disposed downstream of the testing station of the vehicle assembly line and having the vacuum and fill system.

2. The method of claim 1 further including:
   venting the AC cooling circuit after pressurizing and testing for pressurized leaks, and before prevacuuming the AC cooling circuit with the pressure and prevacuum system.

3. The method of claim 1 wherein prevacuuming with the pressure and prevacuum system occurs until one of a pressure level in the AC cooling circuit is below a predetermined low pressure threshold or a predetermined time period expires.

4. The method of claim 3 wherein the predetermined low pressure threshold is approximately 0.5 mmHg and the predetermined time period is approximately 40 seconds.

5. The method of claim 1 wherein pressurizing the AC cooling circuit occurs until a pressure level in the AC cooling circuit is above approximately 278 kPa.

6. The method of claim 1 wherein the AC cooling circuit is filled if a pressure level in the AC cooling circuit is below a predetermined vacuum low pressure threshold.

7. The method of claim 6 wherein the predetermined fill vacuum low pressure threshold is approximately 1.2 mmHg.

8. The method of claim 1 wherein vacuuming the AC cooling circuit occurs until one of a pressure level in the AC cooling circuit is below a predetermined vacuum low pressure threshold or a predetermined time period expires.

9. The method of claim 8 wherein the predetermined vacuum low pressure threshold is approximately 0.08 mmHg and the predetermined time period is approximately 45 seconds.

10. The method of claim 1 wherein testing the AC cooling circuit for vacuum leaks occurs after a predetermined delay after vacuuming the AC cooling circuit.

* * * * *